June 16, 1925.

C. B. FOSTER

STORAGE PLANT

Filed May 29, 1920

Inventor
Charles B. Foster
By Wallace R. Lane
Attorneys.

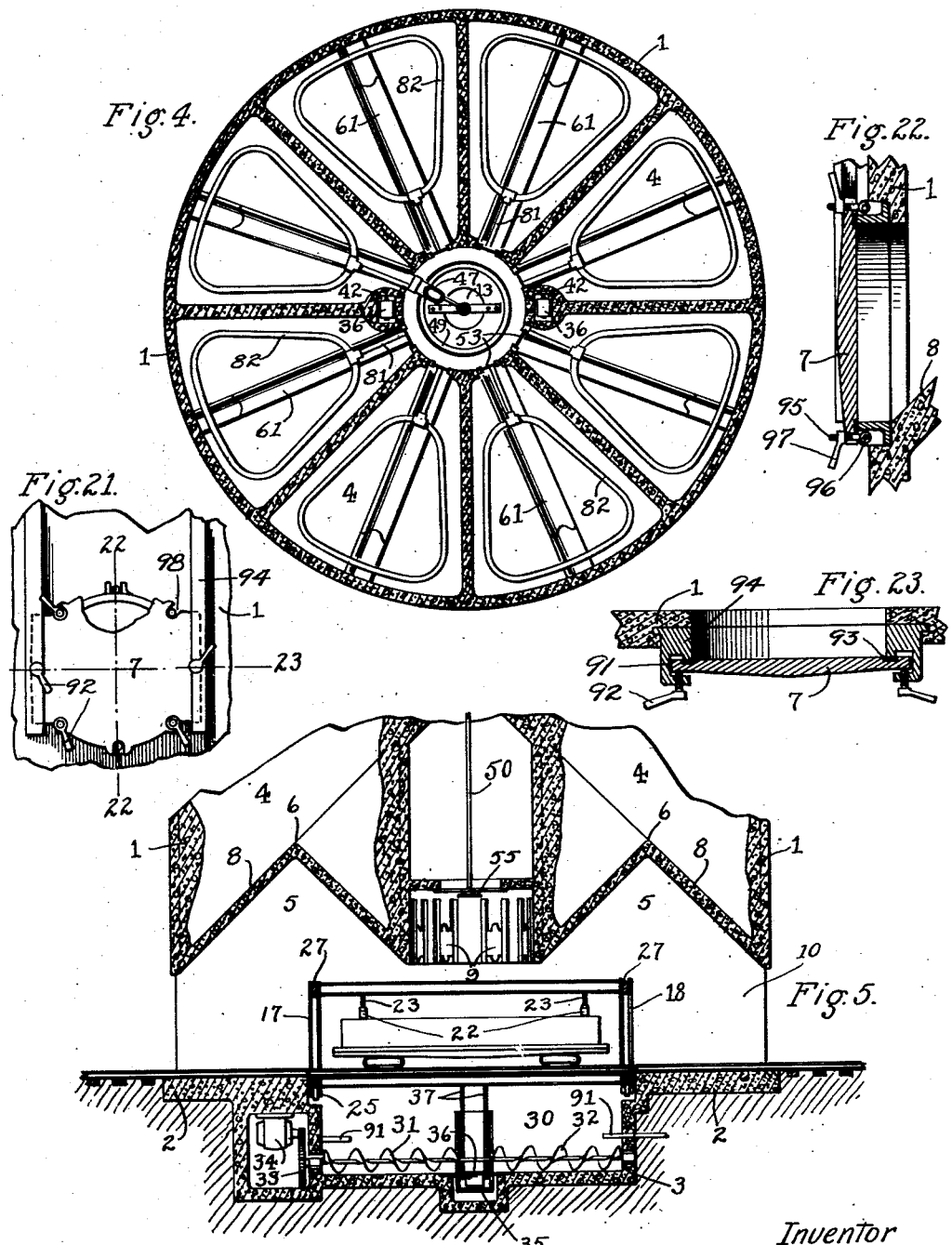

June 16, 1925.

C. B. FOSTER

STORAGE PLANT

Filed May 29, 1920

Inventor
Charles B. Foster
By Wallace R. Lane
Attorneys.

June 16, 1925. 1,542,380
C. B. FOSTER
STORAGE PLANT
Filed May 29, 1920 6 Sheets-Sheet 5
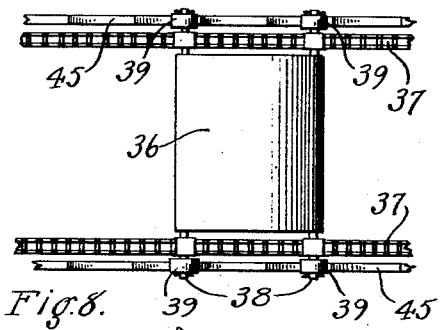
Fig. 8.
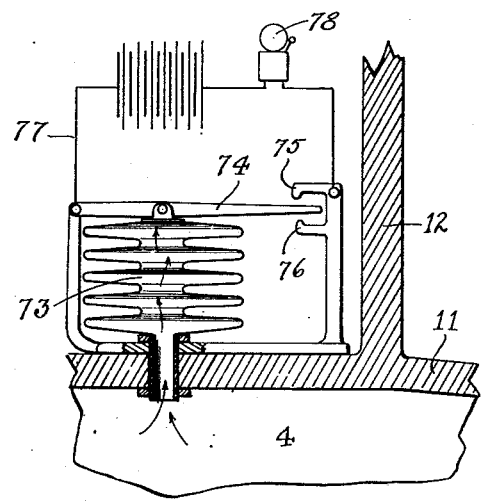
Fig. 11.
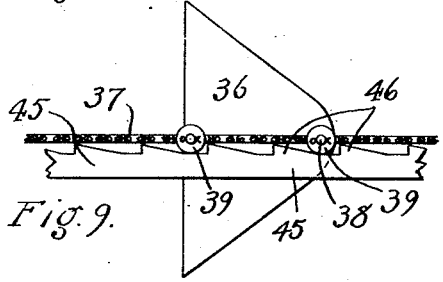
Fig. 9.
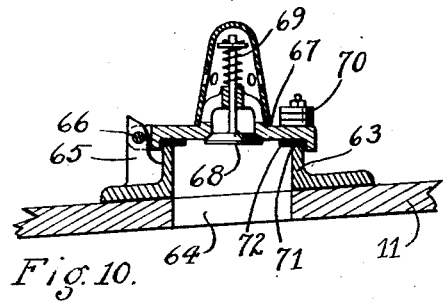
Fig. 10.
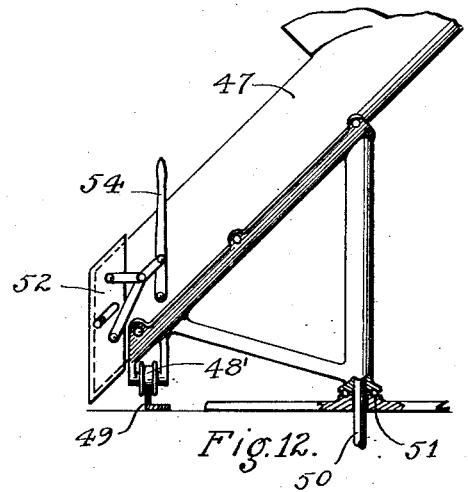
Fig. 12.
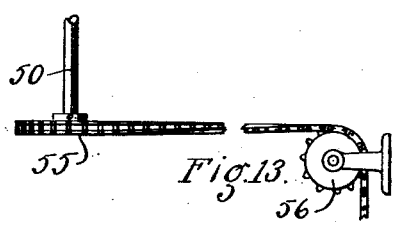
Fig. 13.
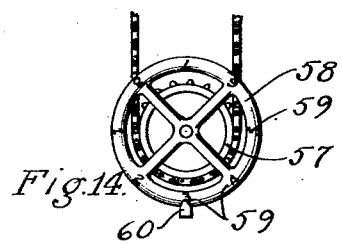
Fig. 14.
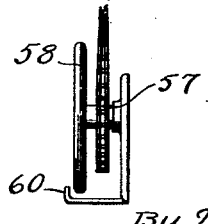
Inventor
Charles B. Foster
By Wallace R. Lane
Attorneys June 16, 1925.
C. B. FOSTER
STORAGE PLANT
Filed May 29, 1920
1,542,380
6 Sheets-Sheet 6
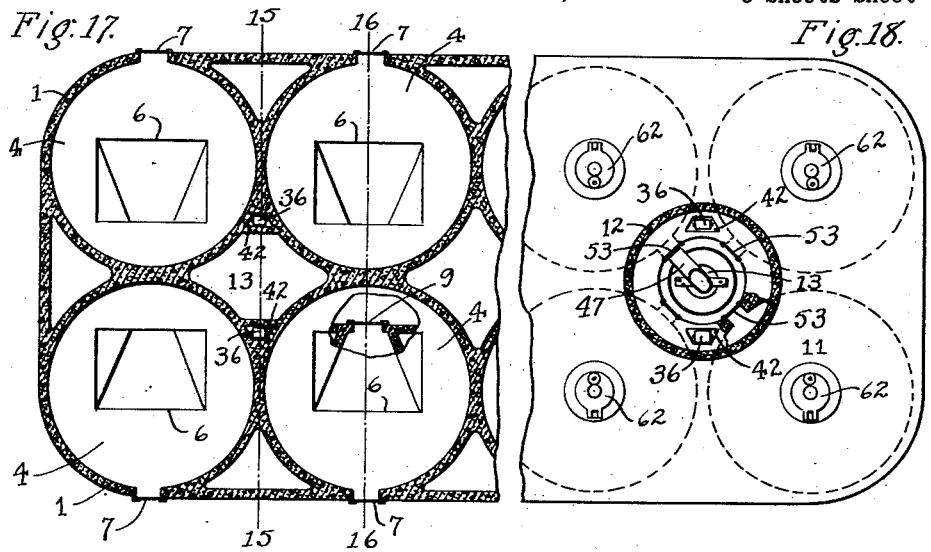
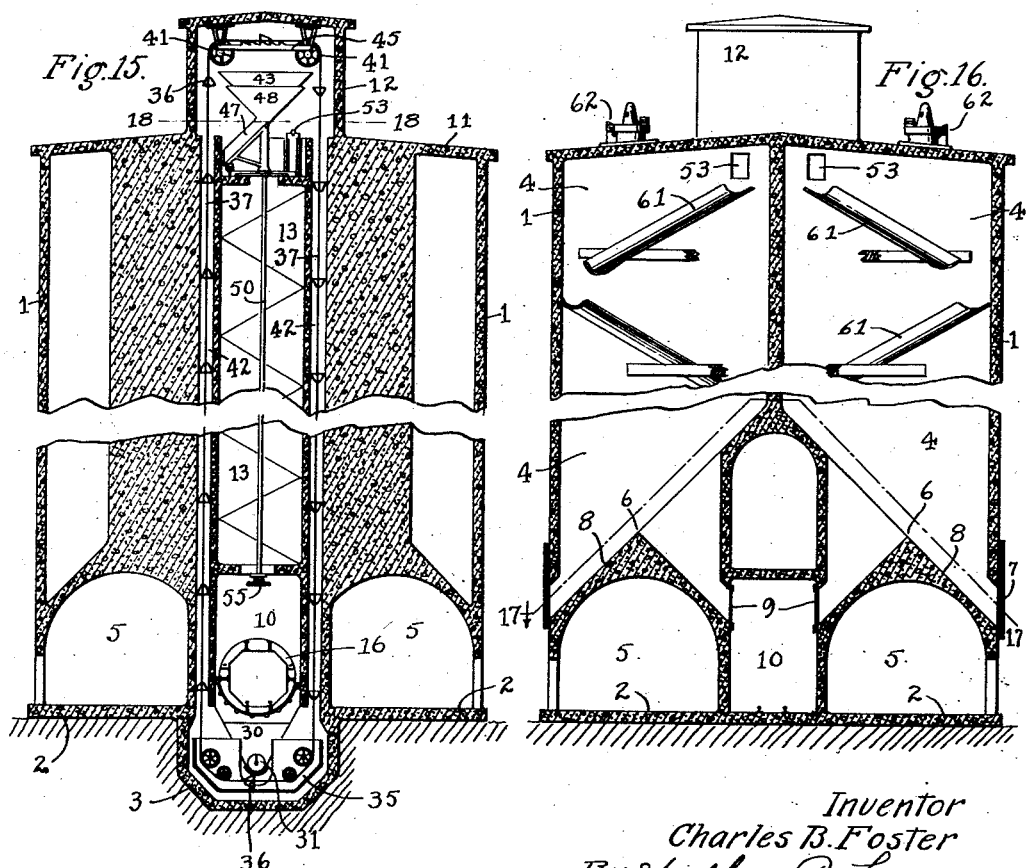
Inventor
Charles B. Foster
By Wallace R. Lane
Attorneys Patented June 16, 1925.

1,542,380

UNITED STATES PATENT OFFICE.

CHARLES B. FOSTER, OF INDIANAPOLIS, INDIANA.

STORAGE PLANT.

Application filed May 29, 1920. Serial No. 385,135.

*To all whom it may concern:*

Be it known that I, CHARLES B. FOSTER, a citizen of the United States, residing in Indianapolis, Marion County, Indiana, have invented a new and useful Improvement in Storage Plants, of which the following is a specification.

This invention relates to a storage plant for storing and handling various materials, and is especially adapted for handling coal and storing the same for long or short periods, without any substantial deterioration.

In order to avert coal shortages and similar trouble during those seasons when artificial heat is vital, it is necessary either for the public to purchase its coal supply during the warmer months, or for the mine operators or coal dealers to store quantities of coal during the spring and summer months sufficiently large to take care of the public needs during the cold season should the usual supply of coal be stopped by strikes or other unforeseen difficulties. In order, however, to permit of such storing of coal, it is necessary to provide ample storing facilities of such nature as to both handle large quantities of coal, and in such manner as substantially prevent deterioration of the same. This would also permit those actively engaged in producing coal to work more uniformly throughout the year.

Among the objects of my invention is to overcome the above mentioned objections and difficulties; further to provide for the storage of materials either dry or under water, exposed to air, or in air tight compartments, as desired; further to provide means for the relief of excess pressure or vacuum in the storage compartments; further to provide novel means for transferring the material to be stored from a car or the like into the bins; further the provision of alarm mechanism to notify the attendant when the pressure in the bins is too high or too low; further to provide novel means for selectively dumping the material into any of the bins, said means being operable from a convenient position; further to effect the certain discharge of the conveyer buckets into the hopper; further to make possible the effective sprinkling of the contents of the bins with water or other liquids; further to effect the passage of material from the top of a tall bin to its bottom, without breakage, when dumped thereinto; further to provide novel means of discharge from the lower portions of the hopper selectively from the outer or inner sides as desired; further to provide means for thawing out and loosening up the bin contents and material being stored when frozen, to permit handling of the same; further to provide novel means for draining any liquids from the tank when desired; and such further objects, advantages and capabilities as will later more fully appear.

My invention further resides in the combination, construction and arrangement of parts illustrated in the accompanying drawings, and while I have shown therein a preferred embodiment of my invention for carrying out the objects and advantages set forth above, I wish it to be understood that the same is susceptible of modification and change, and is to be considered as illustrative only, and not as limiting the scope of my invention.

In the drawings:—

Fig. 4 is a section on line 4—4 of Fig. 1.

Fig. 5 is a fragmentary vertical transverse section through the lower portion of the storage plant shown in Fig. 1.

Fig. 8 is a plan view of one of the buckets, and attached parts of the conveying mechanism.

Fig. 9 is a side elevation of Fig. 8.

Fig. 10 is a vertical detail section of the automatic valve for relieving excessive pressure or partial vacuum.

Fig. 11 is a sectional view partly diagrammatic, showing the alarm mechanism for indicating excessive pressure or partial vacuum.

Fig. 12 is a fragmentary detail view of the rotatable spout for charging the bins.

Fig. 13 is a side elevation showing in detail the mechanism for controlling the rotation of the rotatable spout.

Fig. 14 is a front elevation of the hand wheel shown in Fig. 13, for controlling movement of the rotatable spout.

Fig. 15 is a vertical transverse section, partly broken away, of a slightly modified form, and taken on line 15—15 of Fig. 17.

Fig. 16 is a view similar to Fig. 15, but taken on line 16—16 of Fig. 17.

Fig. 17 is a transverse section taken on line 17—17 of Fig. 16.

Fig. 18 is a transverse section taken on line 18—18 of Fig. 15.

Fig. 19 is a fragmentary vertical section through a portion of the lower part of the exterior of one of the bins shown in Fig. 1, and taken on a plane somewhat to the rear of door 7.

Fig. 20 is a detail sectional view of the combination drain and supply valve of Fig. 19.

Fig. 21 is a detail elevation of my preferred form of door for closing the hopper openings in the bins and which form is obvious and may be used for each of the bin openings if desired.

Fig. 22 is a vertical section on line 22—22 of Fig. 21.

Fig. 23 is a transverse section on line 23 of Fig. 21.

Figure 1:
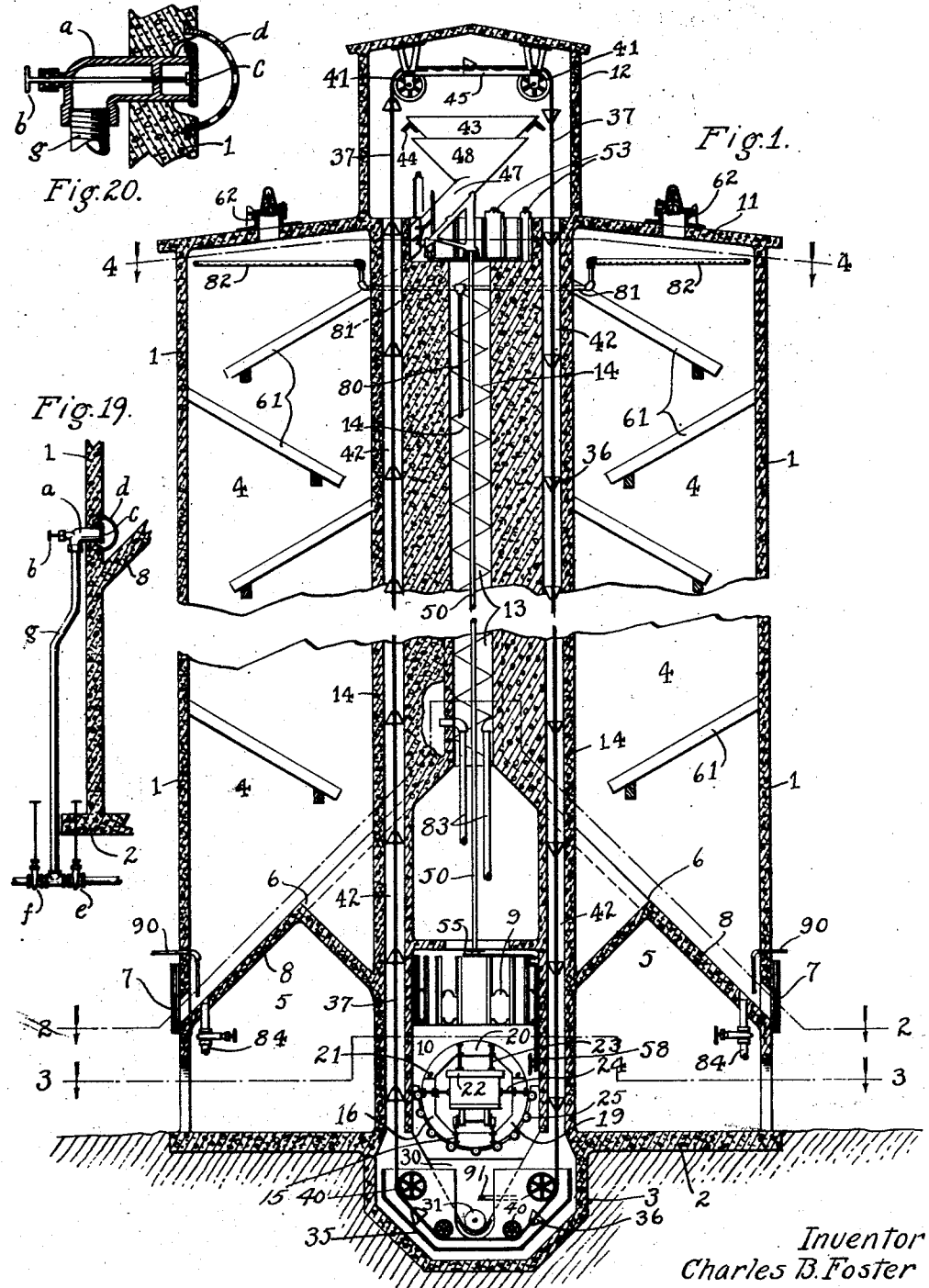
Fig. 1 is a vertical longitudinal section through a storage plant embodying my invention, and taken on line 1—1 of Fig. 2.

Referring to the drawings, it will be seen that my improved storage plant comprises the main body portion 1, preferably of reinforced concrete, but it is, of course, understood that other suitable materials may be used in its construction if desired. The body portion 1 rests upon the foundation 2, within which is formed the depression 3 for the reception of the lower part of the conveying mechanism to be hereinafter described. The body portion 1 comprises one or more storage bins 4, beneath the bottom of which are formed chambers 5 for storing any material desired such, for example, as building materials, or the like. The bottoms of bins 4, as shown in Figs. 1 and 2, are formed with the ridge portion 6 so arranged as to direct the stored material in both directions for discharge either through door 7, located at the outer end of hopper 8, or through one of the doors 9, formed in the inner wall of the hopper for discharging its contents into any suitable conveyance within the passageway 10, which as shown in Figs. 1 and 3 extends transversely through the bottom of the storage plant.

Bins 4 at their upper ends are provided with the top wall 11, upon which is constructed the cupola 12 for housing the upper portion of the conveying mechanism hereinafter referred to. Extending vertically and centrally of the storage plant, is the passageway 13, leading from the bottom transverse passageway 10 to the interior of the cupola 12, and being provided on its interior with the stairway 14, which obviously may assume the form of a ladder or other suitable means for permitting passage of a person from the bottom to the cupola.

Figure 2:
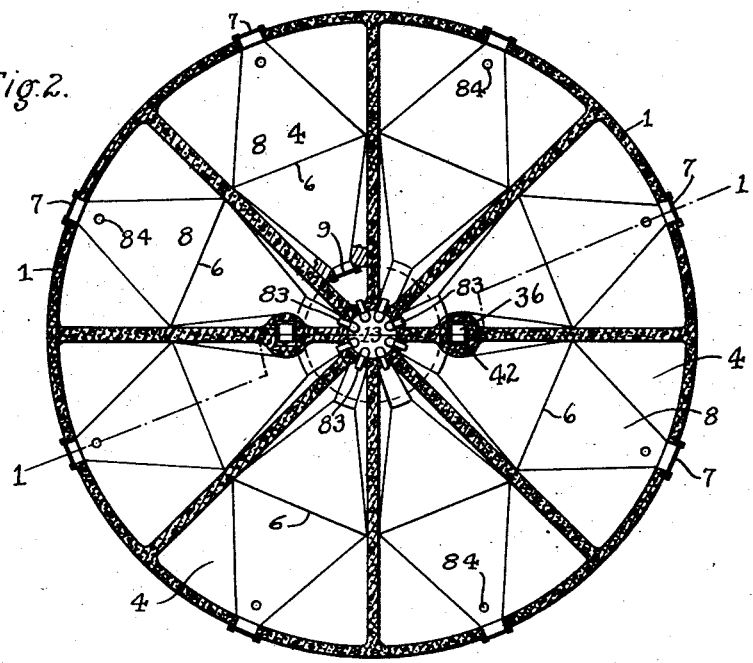
Fig. 2 is a horizontal transverse section on line 2—2 of Fig. 1.
Figure 3:
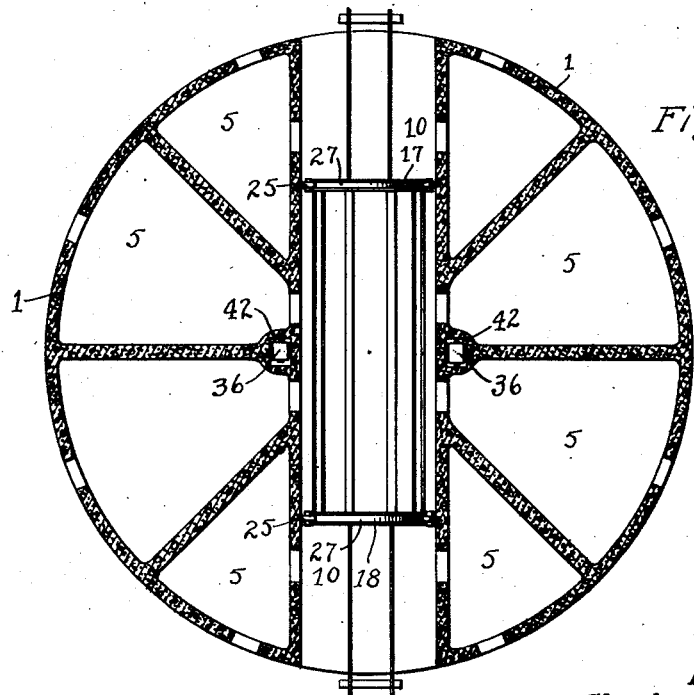
Fig. 3 is a section on line 3—3 of Fig. 1.

Referring to Figs. 1 and 3, a trackway 15 passes through the passageway 10, in the latter of which, preferably centrally located, is constructed the car dumper 16, comprising a suitable framework, having the end members 17 and 18, each in turn comprising the lower portions 19 and the upper portions 20, the latter of which are removably secured to the former by pins, bolts, or the like, 21, passing through suitable openings in the cooperating parts. This arrangement permits the upper portions 20 of the car dumper to be raised and lowered to accommodate cars of different heights, and when closed the timber 22 will contact with the top of the car and be secured thereagainst by means of the clamping screws 23; there also being provided clamping screws 24 for operating in a similar manner against the sides of the car, to hold the same securely in position when being overturned. The car dumper is mounted upon wheels or rollers 25, whereby it may be rotated by any suitable source of motive power acting through the medium of pinions (not shown) which in turn mesh with the shrouded gear 27, formed in the ends 17 and 18 of the dumper. Upon rotation of the car dumper, the contents of the car is dumped into hopper 30, shown more clearly in Figs. 1, 5 and 6, in which hopper is rotatably mounted the right and left hand worm feed 31 and 32, operated through gearing 33 by a suitable motor 34, and arranged to move the contents of hopper 30 toward the center, where it will be dumped into the central hopper 35, within which move the conveying buckets 36, carried by sprocket chains 37, or other suitable flexible carrying elements, and provided with the extending shafts 38, carrying rollers 39 (see Figs. 8 and 9) for the purpose hereinafter set forth. The hopper 35 hangs in the sprocket chains 37 to keep the same constantly taut, which chain passes under sprockets wheels 40, rotatably secured to hopper 35. Rotatably mounted in the cupola 12 are sprocket wheels 41, over which the sprocket chains 37 pass, and which supports the weight of the conveying mechanism in an obvious manner.

Figure 6:
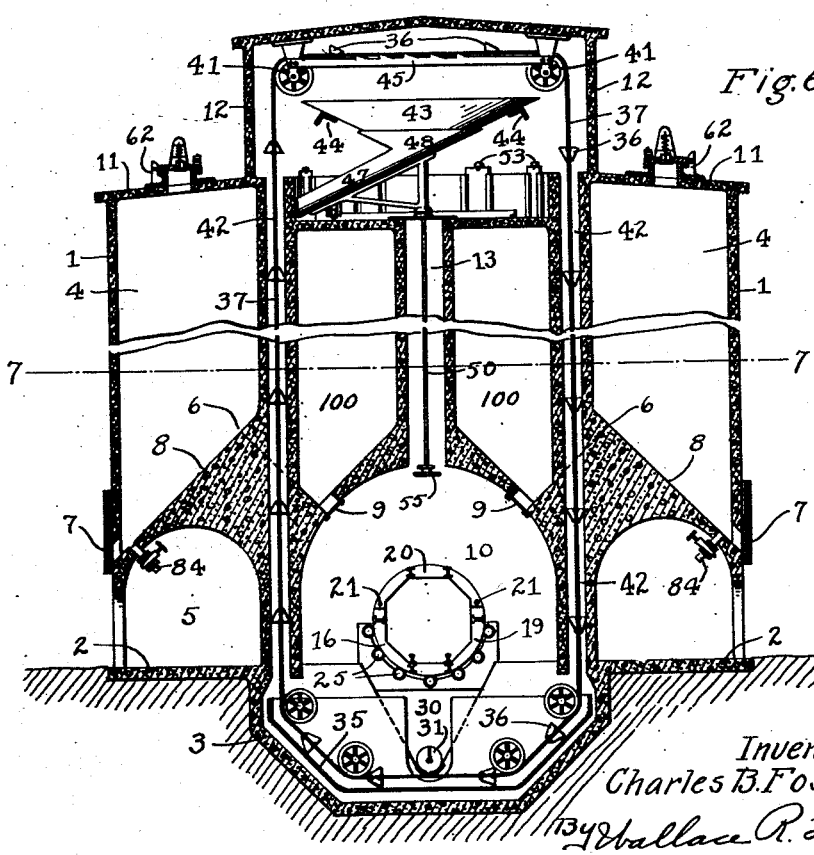
Fig. 6 is a vertical transverse section partly broken away, through one of my storage plants, and showing a slightly modified form.

As shown in Figs. 1 and 6, the conveyer buckets 36 pass upwardly through the vertical passageways 42 oppositely positioned and formed in the body portion 1 of the storage plant, and after passing through hopper 35 and receiving their load of material to be stored, pass upwardly over sprocket wheels 41, and dump their contents into hopper 43, suitably mounted on supporting frames 44.

To insure that the entire contents of the buckets 36 are emptied therefrom, I have provided the cross bars 45, extending between the brackets supporting sprocket wheels 41, and which cross bars have formed on the upper surface thereof a suitable number of shock producing projections 46 over which rollers 39 of buckets 36 pass when directly over hopper 43, to cause vibration and shock of buckets 36 to jar therefrom any contents that might otherwise tend to stick or remain therein.

Directly below hopper 43 is the rotatable spout 47, formed at its upper end 48 of suitable construction to fit under hopper 43, to guide the contents therefrom into spout 47, which latter carries rollers 48' for engagement with circular track 49. Suitably fixed to spout 47 at its axis of rotation, is the downwardly extending vertical shaft 50, which upon suitable rotation will cause spout 47 to move about track 49, in an obvious manner. Ball bearings 51, or the like, (see Fig. 12) may be provided to facilitate easy movement of spout 47, upon the lower outer end of which is carried the slidable extension 52, to bring the spout into suitable registry with the charging openings covered by gates 53, which facilitate passage of material from spout 47 into the bins. Extension 52 is operated through the links and levers shown in Fig. 12 by the handle 54.

Fixed upon the lower end of shaft 50 is a sprocket wheel over which passes sprocket chain 55, which in turn passes over guide sprocket 56, and the main sprocket 57. Fixed in connection with the latter for rotating the same is operating wheel 58, carrying suitable index numbers or indicia 59, which coacting with pointer 60 enables the operator in a convenient position at the bottom of the bins to swing spout 47 into registry with any one of the charging openings covered by gates 53, to permit bins 4 to be selectively filled as desired.

The material being stored, in passing from spout 47 into bins 4, will by means of inclined chutes 61, be gradually transferred to the bottom of the hopper or to the level of the contents therein, thus preventing breakage of the material being stored, which would occur should the material fall directly from the charging door to the bin bottom.

The closures for the bins 4, for example, the gates 53, 7 and 9 (and any other openings that may be provided therein) are of air tight construction, so as to prevent the entry of further air into the bins 4 after being filled, to prevent deterioration of the contents that ensues with many materials from contact with the air. One example of this is in the case of coal, which it is well known cannot be mined in the spring and exposed to the air until the following winter, without very considerable deterioration.

To prevent the creation of excessive pressure in the bins by chemical action, or otherwise, in the contents, and further to prevent the formation of a partial vacuum therein, I have provided in the top 11 for each bin, the automatic relief valve indicated generally at 62, and shown in detail in Fig. 10. This valve comprises the body portion 63, mounted with its vertical opening in registry with opening 64, through top wall 11, and provided at one side with the upstanding arm or arms 65. Pivotally connected with arm 65 at 66 is the plate 67, provided in its central portion with a valve seat with which engages valve 68, the valve stem of which carries spring 69, which normally holds the valve in closed position. Adjacent the free end of plate 67, are removably mounted, weights 70, which may be removed or added to vary the effective pressure at which plate 67 will be lifted from its seat 71, by such excessive pressure as may exist within the bins. A gasket 72 is provided to contact with seat 71, to further render this relief valve air tight when closed. Should there be a partial vacuum created within the bins, the same will be relieved by inward movement of valve 68 against the action of spring 69, which latter will return the valve to position when the partial vacuum has been relieved.

I have also provided an automatic alarm mechanism to alarm the attendant immediately upon formation within the bins of either an excessive pressure or a partial vacuum. This alarm mechanism is shown in detail in Fig. 11, and comprises the expansion and contraction member 73, which will expand or contract in a well known manner, by the creating of pressure or partial vacuum within the bins to elevate or lower arm 74 of metal, or other suitable conducting material, and bring the same into contact with one or the other of terminals 75 or 76, which in an obvious manner completes the circuit through line 77 to ring the alarm bell 78, and warn the attendant of pressure or partial vacuum within the bins, thus supplementing the action of the relief valve, and enabling the attendant, should the relief valve fail to operate, to relieve said pressure or partial vacuum in other ways, such as by opening any of the doors or other closures in the bins.

It is oftentimes desirable in storing such materials as coal, or the like, to submerge the same in the water. To this end I have provided pipe 80, extending upwardly through passage 13, or in some other convenient location. Extending from the top of each pipe laterally into each of the bins are the extensions 81, carrying at their outer ends, one in each bin, the sprinkling head or pipe 82, which may assume any contour desirable, but which I have shown in Fig. 4 as being of loop formation to extend around the upper portion of each bin, and perforated to provide for sprinkling or spraying water upon the contents of the bin. This sprinkling system is primarily for wetting the contents of the bin, and if it is desired to more quickly submerge the same under water, this action can be accelerated or entirely accomplished by the series of pipes 83, each of which enters one of the bins at any suitable point intermediate of its height, as shown in Fig. 1. These pipes will be provided with suitable valves (not shown), and enable the operator to quickly fill the bin with water, when desired. Adjacent the lowest portion of the bin is provided outlet pipes 84, through which the bins can quickly be emptied.

The main water inlet and outlet may be combined in a single device, if desired, as illustrated in Fig. 19, and more in detail in Fig. 20, in which the sides of the bin 1, and the angularly extending bottom 8 of the same, are shown in fragmentary relation, the side wall having extending therethrough the connection or head $a$, through which extends the valve stem $b$, which connects at its inner end with the swinging gate valve $c$, pivoted to head $a$, and which swinging valve is covered by a perforated hood $d$. Connecting the head with the supply pipe $e$, and discharge pipe $f$, is the vertically extending pipe $g$. The operation of this device to fill the tank is as follows: First draw back valve stem $b$, allowing the gate valve $c$ to seat itself, after which the valve of drain pipe $f$ will be closed, and thereafter supply pipe $e$ will be opened, thus filling the tank through pipe $g$ and head $a$. When the bin is full the valve of supply pipe $e$ will be closed, and the valve of drain pipe $f$ will be opened, the pressure of the water against the swinging valve $c$ will hold the same against its seat in an obvious manner. To drain the bin the above operations will be reversed, and the swinging valve $c$ will be opened by suitable rotation of valve stem $b$, thus permitting the liquid contents of the bin to drain out to drain pipe $f$; it being understood that the connection of valve stem $b$ with swinging valve $c$ is such as to permit valve $c$ to swing away from valve stem $b$, but to be pushed open by valve stem when the latter is advanced. In order to permit water to pass from one bin to another, a suitable valve or opening may be provided between the various bins.

Steam pipes 90 and 91 connected with a suitable source of steam supply, are provided adjacent the discharge openings, and in hopper 30, to permit the thawing out of the materials to be handled should the same be frozen. From the arrangement of the chutes at the bottom of the bins, as seen is Fig. 1, I am enabled to selectively discharge the contents of the bins to wagons, or the like, on the outside of the bins, or to a suitable conveyance, such as a freight car or other vehicle, within passageway 10.

Figure 7:
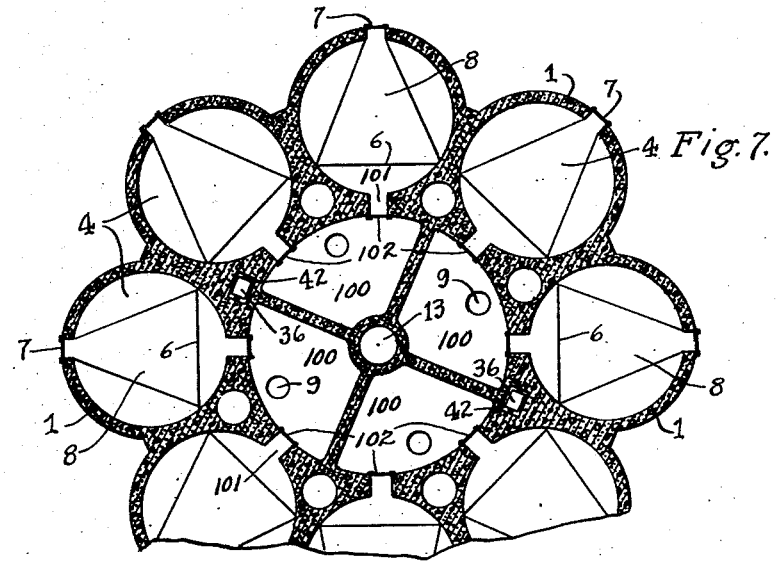
Fig. 7 is a horizontal transverse section on line 7—7 of Fig. 6.

In order to more successfully withstand the bursting pressure of water within the bins, the same may be constructed of circular cross section, as shown in Fig. 7.

Also, if desired, my invention may be applied in various forms and arrangements of bins, a battery of which is illustrated in Figs. 15 to 18, it being understood that any number of such bins desired may be included in one battery, and such battery may be of monolithic or other construction desired.

In Figs. 21, 22 and 23 is illustrated the preferred form of door for closing the outlet and inlet openings to the bins, and each comprises the door slidably mounted as shown in Fig. 23 in the vertical guideway 91, within which it may be secured in fixed relation to the guideway by tightening screw 92. Between the door and the frame is provided the gasket 93 for rendering the closure water-tight and air-tight when desired. The frame 94 carries bolts 95 pivotally mounted to the frame at 96 and provided with the hand nut 97 to permit easy tightening of the same against the door when the bolt is moved into its corresponding slot 98 formed one for each bolt in the door. This construction permits door 7 to be moved vertically in guideway 91 when bolts 95 are sprung back against the sides of the bin walls and when the door is in closed position permits the bolts to be moved into their corresponding slots for firmly clamping the door closed. The door, if large and of considerable weight may be moved by any power increasing device such as pulley counter-weights or the like not shown. While I have more particularly described this door in connection with the lower hopper openings I wish it to be understood that the same is capable of application to any of the inlet or outlet openings of the bins.

In the modified form of Figs. 6 and 7, I have illustrated the provision of one or more bins or compartments 100, around the central vertical passages 13, between which and the outer bins 4, are communicating passageways 101, closed if desired by suitable closures or doors 102.

Having now described my invention, I claim:

1. In a storage plant, a tower provided with a vertically arranged shaft, a series of storage bins disposed vertically of said tower and arranged about the shaft, a passageway transversely through the base of said tower and communicating with said shaft to permit a conveying means to be positioned in said passageway beneath said shaft, means adapted to receive the contents from said conveying means and to raise said contents to the top of said tower, said means being adapted to discharge said contents into any desired bin disposed about said shaft, each of said bins having a door located at the base thereof and adapted to discharge into said passageway in the localized area of said shaft whereby a conveying means disposed in said localized area can receive the contents from any desired bin.

2. In a storage plant, a tower provided with a vertically arranged shaft, a series of storage bins disposed vertically of said tower and arranged about the shaft, a passageway transversely through the base of said tower and communicating with said shaft to permit a conveyance to be positioned in said passageway across the bottom of said shaft, a conveyor located in said tower and having a portion disposed at the base of said passageway and constructed and arranged to receive the contents from said conveyance and raise the same to the top of the tower, means to discharge said contents into any desired bin at the top of said tower, each of said bins having a door located at the base thereof and adapted to discharge into the shaft whereby a conveyance positioned across the bottom of said shaft can receive the contents from any desired bin.

3. In a storage plant, a tower provided with a vertically arranged shaft, a series of storage bins disposed vertically of said tower and arranged about the shaft, a passageway transversely through the base of the tower and communicating with said shaft to permit a conveyance to be positioned in said passageway across the bottom of said shaft, each of said bins having a door located at the base thereof and adapted to discharge into the shaft whereby a conveyance positioned across the bottom of said shaft can receive the contents from any desired bin.

4. In a storage plant, a tower provided with a vertically arranged shaft, a series of storage bins disposed vertically of said tower and arranged about the shaft, a passageway transversely through the base of the tower and communicating with said shaft to permit a conveyance to be positioned in said passageway across the bottom of said shaft, each of said bins having a door located at the base thereof and adapted to discharge into the shaft whereby a conveyance positioned across the bottom of said shaft can receive the contents from any desired bin, and each bin having an independent door disposed on the exterior face thereof to permit discharge of the contents thereof and a dividing member in the base of each bin having opposed inclined surface adapted to deflect the contents of the bin toward each door.

5. A storage plant comprising a concrete tower provided with a central vertically disposed shaft, and a series of vertically arranged bins radiating from and circumferentially about said shaft, each of said bins having an outlet, and said series of outlets being arranged in a substantial circle to discharge into the base of said shaft, and a passage through said tower at the base thereof, said passage intersecting said shaft whereby to permit a conveyance to be positioned across said shaft to receive the contents from any one or all simultaneously of said series of doors.

6. In a storage plant, a tower, bins arranged around said tower, means in the tower to convey material to the upper part of the bins, a passageway in the lower end of the tower for passage of a conveyance therethrough, means at the lower end of the bins for discharging material into a conveyance in said passageway, and means at the lower end of the bins for discharging material therefrom into conveyances at the outside of the bins.

In witness whereof, I hereunto subscribe my name to this specification.

CHARLES B. FOSTER.